United States Patent [19]

Bartholomew et al.

[11] Patent Number: 5,211,810

[45] Date of Patent: May 18, 1993

[54] ELECTRICALLY CONDUCTIVE POLYMERIC MATERIALS AND RELATED METHOD OF MANUFACTURE

[75] Inventors: Gene W. Bartholomew, Tuxedo Park; Jongchul Kim, Chester; Raymond A. Volpe, Newburgh; Donna J. Wenzel, Middletown, all of N.Y.

[73] Assignee: International Paper Company, Purchase, N.Y.

[21] Appl. No.: 565,300

[22] Filed: Aug. 9, 1990

[51] Int. Cl.$^5$ .............................. D21H 11/20
[52] U.S. Cl. ........................ 162/9; 162/127; 162/129; 162/138; 162/157.6; 162/182
[58] Field of Search .................. 162/138, , 125, 127, 162/129, 157.6, 9; 427/121

[56] References Cited

U.S. PATENT DOCUMENTS

| | | | |
|---|---|---|---|
| 4,267,420 | 5/1981 | Brastad | 219/10.55 E |
| 4,468,291 | 8/1984 | Naarmann et al. | 204/13 |
| 4,521,450 | 6/1985 | Bjorklund et al. | 427/121 |
| 4,578,433 | 3/1986 | Muenstedt et al. | 525/417 |
| 4,604,427 | 8/1986 | Roberts et al. | 525/185 |
| 4,617,228 | 10/1986 | Newman et al. | 428/265 |
| 4,641,005 | 2/1987 | Seithferth | 219/10.55 |
| 4,642,331 | 2/1987 | Hodge | 528/492 |
| 4,696,835 | 9/1987 | Maus et al. | 427/121 |
| 4,710,400 | 12/1987 | Gardini et al. | 427/121 |
| 4,720,393 | 1/1988 | Bjorklund | 427/58 |
| 4,731,311 | 3/1988 | Suzuki et al. | 429/213 |
| 4,735,513 | 4/1988 | Watkins et al. | 383/116 |
| 4,803,096 | 2/1989 | Kuhn et al. | 427/121 |
| 4,806,204 | 2/1989 | Manfre et al. | 162/138 |
| 4,864,089 | 9/1989 | Tighe et al. | 219/10.55 E |
| 4,876,423 | 10/1989 | Tighe et al. | 219/10.55 E |
| 4,892,782 | 1/1990 | Fisher et al. | 428/240 |

FOREIGN PATENT DOCUMENTS 59-76994  5/1984  Japan .................. 162/125

OTHER PUBLICATIONS

*Chemistry & Engineering*, "Alternate Theories of Conductivity in Nonconjugated Polymers Debated", May 7, 1990, pp. 53–55.
*Science*, "Conductive Polymers Recharged", vol. 246, Oct. 13, 1989, pp. 208–210.

*Primary Examiner*—Peter Chin
*Attorney, Agent, or Firm*—Dara L. Onofrio; Glenn F. Ostrager

[57] ABSTRACT

Electrically conductive polymeric materials, having microwave susceptive characteristics, are produced by suspending a fibrous based material and a monomer precursor of a conductive polymer in an aqueous solution. Addition of a chemical oxidant induces polymerization of the monomer resulting in coating of the fibrous based material. The invention provides a susceptor material useful for cooking food items in a microwave oven, and enhances the browning and/or crispening of the items. Conductive polymer coated fibrous based materials can be formed into a paper product by conventional papermaking techniques or molded into an integral structures having microwave interactive properties.

23 Claims, 26 Drawing Sheets

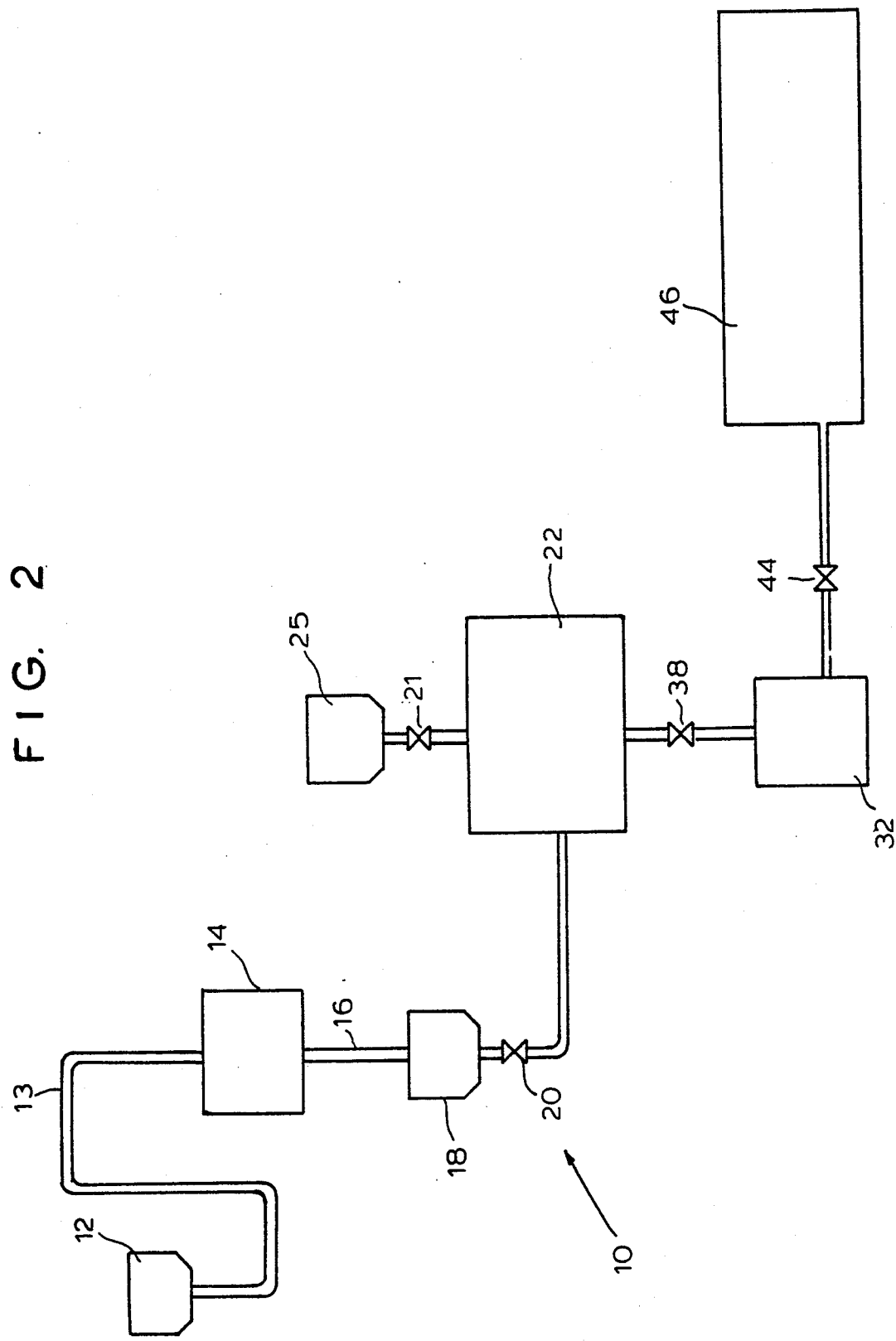

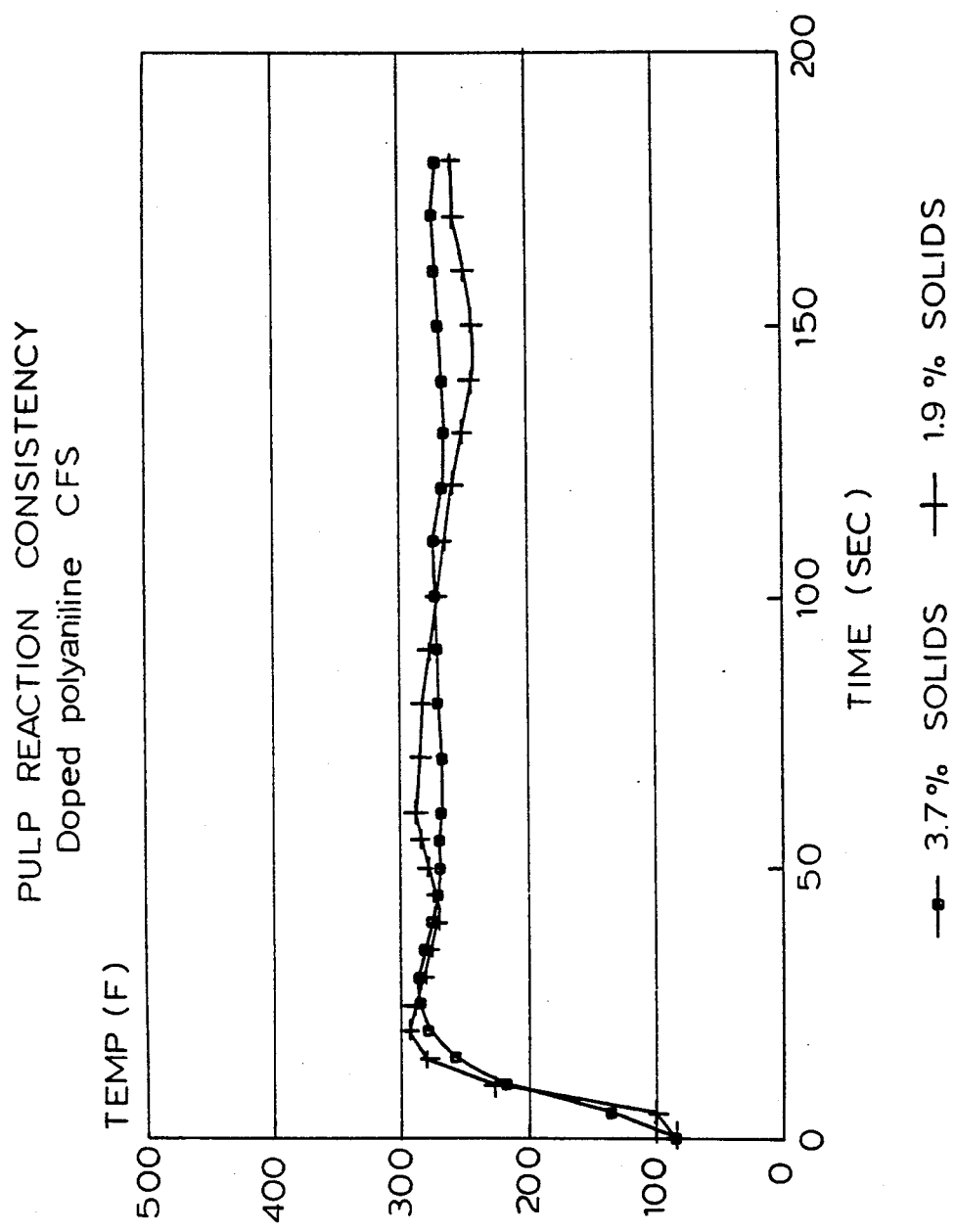

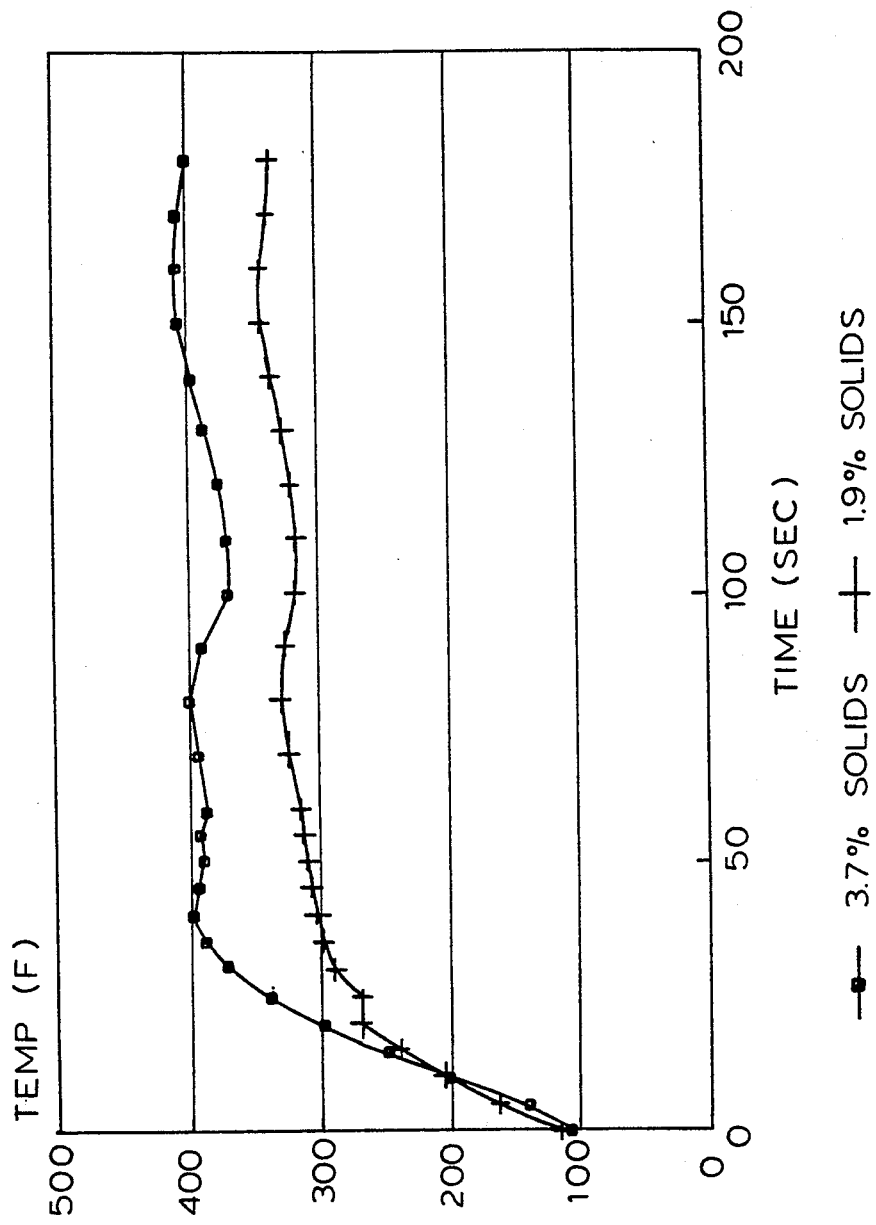

EFFECT OF POLYMERIZATION TEMP
Doped 150 lb/ 3 MSF polyaniline CFS

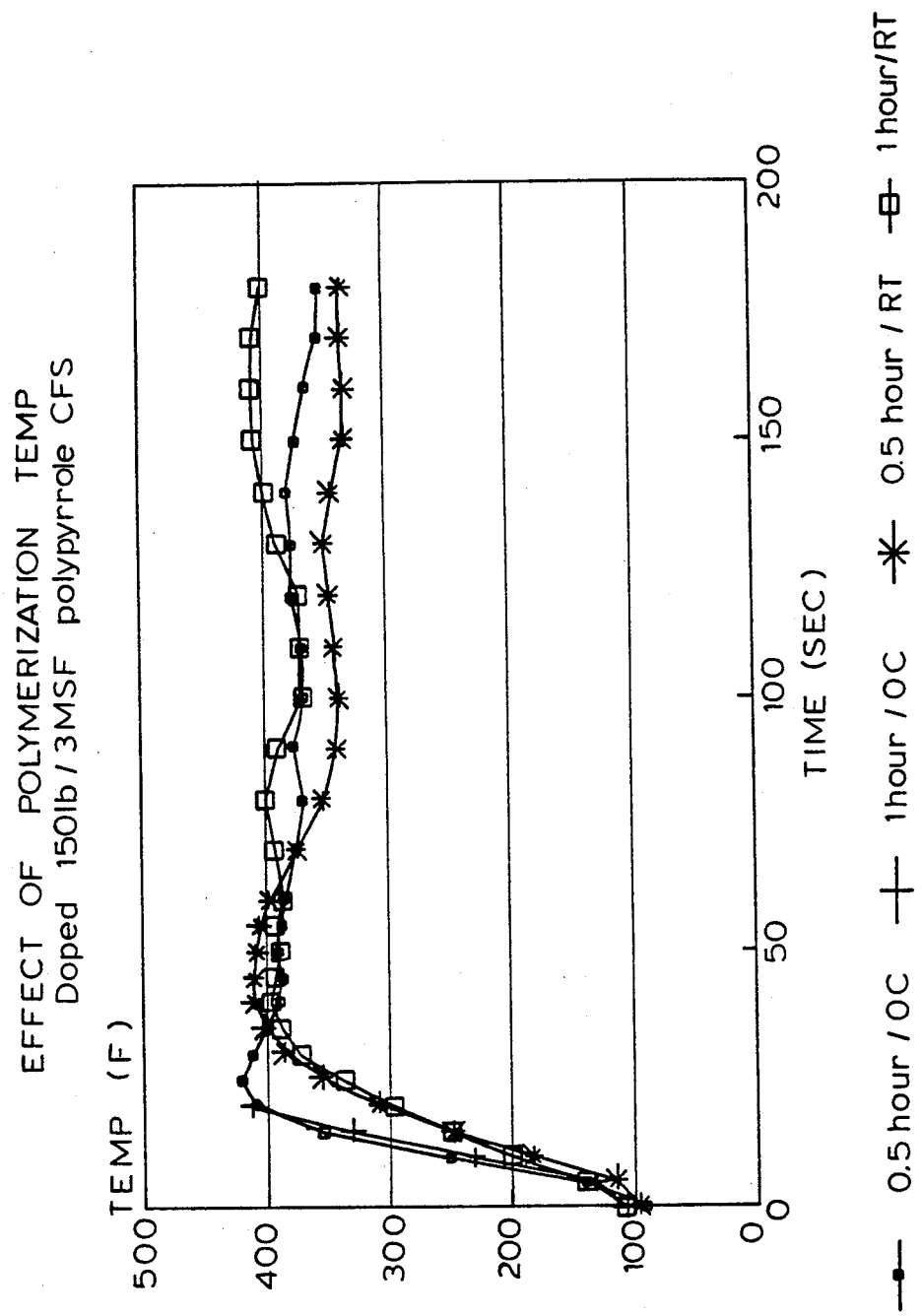

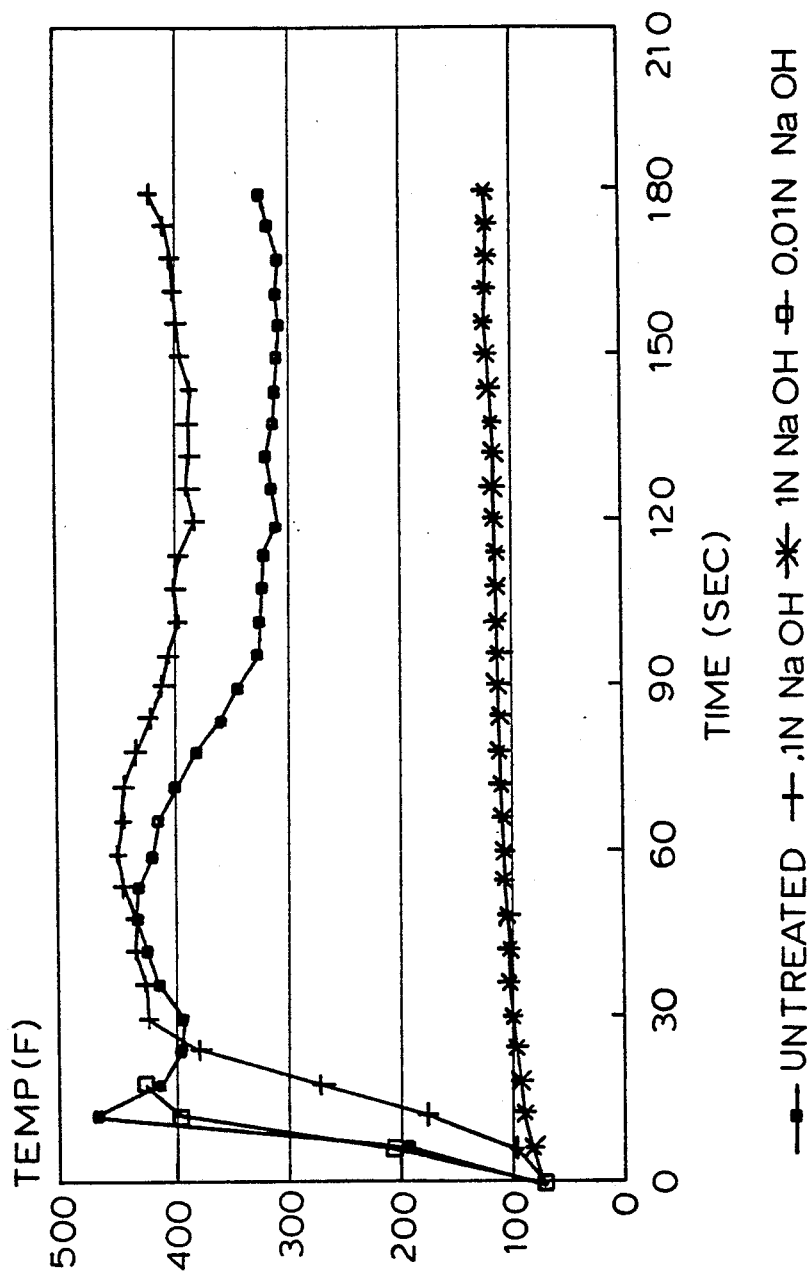

58
56

ELECTRICALLY CONDUCTIVE POLYMERIC MATERIALS AND RELATED METHOD OF MANUFACTURE

FIELD OF INVENTION

This invention generally relates to electrically conductive polymeric materials useful in microwave cooking and packaging of food items. More particularly, it concerns a method for enhancing the processibility of conductive polymers to impart electrically conductive characteristics, specifically microwave susceptive characteristics, to fibrous based materials.

BACKGROUND ART

Temperatures obtained in conventional high frequency microwave ovens, which impart surface temperatures to foods of approximately 200° F., are insufficient to brown and crisp food products. Cooking temperatures in conventional radiant ranges of 250°-600° F. are required for effective browning and crisping of foods. To simulate radiant heat sources in microwave cooking, the food packaging industry has employed microwave susceptor materials which impart radiant temperature levels to food surfaces in the presence of microwave energy. Such susceptor materials have found wide application in providing disposable ovenable food containers made of paper and paperboard.

Conventional susceptor materials are fabricated by depositing a film of conductive elemental metal on a non-interactive or microwave transparent supporting substrate, which may be a biaxially oriented polyester film, by the process of vacuum vapor deposition or sputtering onto the plastic film. Such metallized substrates are laminated to paper, paperboard or other rigid materials to provide microwave interactive disposable food packaging (see U.S. Pat. No. 4,267,420 to Brastad, 4,641,005 to Seitferth or 4,733,513 to Watkins). Microwave energy interacts with the conductive metal coating to generate heat and provide a susceptor feature. However, conventional metalized films are not entirely satisfactory in that they require use of adhesives in the fabrication of the packaging. Adhesives may emit volatile chemicals at high temperatures generated by the conductive metal coating presenting a health hazard. Thus adhesives require additional processing and safety specifications to meet FDA safety requirements.

It has been proposed that microwave susceptor characteristics may be provided through use of conductive polymers. U.S. Pat. No. 4,892,782 to Fisher et al. discloses microwave packaging materials comprising drapable, liquid permeable, woven or nonwoven fibrous dielectric substrates, coated with susceptor materials including metal alloys or conductive polymers. Microwave packaging materials are provided with a means for removing liquid by-products. During microwave cooking of food items the susceptor heats up and moisture evolves as vapors, hastening the browning and crisping of the food surface.

Fisher discloses use of a microwave cooking package consisting of a single layer of polyaniline coated onto a "Dacron" polyester cloth placed on top of a "Teflon" polytetrafluoroethylene plate. See Example 2. However, this approach is not entirely satisfactory in that it is limited to microwave applications which employ porous susceptor materials. Further, processing difficulties are inherent in the use of the Fisher coating technique in that no mechanism is disclosed for obtaining uniform or controlled polymer deposition on the substrate. Thus, absent is a mechanism or suggestion of how to control heat profile characteristics in the susceptor material.

Further, attempts in the art to utilize conductive polymers in microwave and other applications has presented problems because of their instability in air, insolubility in both organic and inorganic solvents making them difficult to process, and variable conductivity.

The prior art has sought to enhance the stability of conductive polymers by incorporating atoms such as sulfur, nitrogen, and oxygen into the polymer backbone. Polypyrrole, a chain of five-membered rings, each of which contains a nitrogen atom, remains stable in the atmosphere indefinitely. Analogous compounds with sulfur and oxygen atoms in the nitrogen position are polythiophene and polyfuran which are stable and conductive.

Processing resistance of conductive polymers, in part, is a consequence of the fact that they form rigid, tightly packed chains which are essential if electrical charges are to jump from one molecule to the next as current moves through the polymer. The tight packing also prevents the polymer chains from intermixing with solvent molecules, making the polymer as a whole a hard, insoluble mass and thus unprocessible.

To improve the processibility of conductive polymers the art has proposed that solubility be enhanced by incorporating aliphatic side chains to the monomer molecule of the conductive polymer. Processibility may also be enhanced by incorporating a chemical oxidant in a host polymer film and then exposing the film to a monomer vapor resulting in a conductive polymer inside a processible film matrix. Additionally, electrochemically produced conductive polymer films are thin and brittle making them difficult to process.

U.S. Pat. Nos. 4,604,427 to Roberts and 4,521,450 to Bjorklund disclose methods for producing stable conductive polymers. Roberts introduces a conductive polymer onto the surface layer of a host polymer and polymerization thereof is initiated through exposure to an oxidant initiator. Bjorklund describes a method of depositing a coating of a doped conductive polypyrrole on a solid impregnable base. However, both methods are multistep processes with an economic disadvantage for bulk production.

U.S Pat. No. 4,803,096 to Kuhn et al. discloses a method for creating electrically conductive fabrics. Reaction conditions are controlled so that there is epitaxial deposition of the monomer of the conductive polymer onto the textile fiber and thereafter polymerization occurs. Kuhn teaches use of doping procedures for enhancing electrical activity in conductive polymers.

There is a need in the art for a nonporous, flexible microwave susceptor material including conductive polymers and fibrous material which may be engineered to meet specific heat profile requirements for microwave cooking applications. To this end processes are required to enhance the solubility and conductivity of polymers. This invention is directed to provision of such processes and paper-like flexible, non-porous products which have diverse packaging applications in the microwave food industry. It will be appreciated that advantage would be obtained by providing such an alternative to metallic conductor or semiconductor films as microwave susceptor materials.

Accordingly, it is a broad object of the invention to provide electrically conductive polymeric materials which utilize polymers having microwave susceptive characteristics.

A more specific object of the invention is to provide a method which enhances the processibility of conductive polymers while maintaining high microwave interactivity.

Another object of the invention is to provide a method for producing electrically conductive polymeric materials which are less complex and improved over the prior art.

A further object of the invention is to provide low cost, flexible food packaging which can be used in microwave cooking that incorporates electrically conductive polymeric materials.

A further specific object of the invention is to provide microwave paper-like food packaging in which the basis weight and relative amounts of electrically conductive polymeric materials may be varied to accommodate specific heat profile requirements of food products.

DISCLOSURE OF THE INVENTION

In the present invention, these purposes, as well as others which will be apparent, are achieved generally by providing microwave susceptor materials which utilize electrically conductive polymers coated on fibrous based materials. An electrically conductive fibrous based material is produced by a method including the steps of suspending a fibrous based material in an aqueous solution, adding a monomer precursor of a conductive polymer to the aqueous solution to create a slurry, and inducing polymerization of the monomer precursor by addition of a chemical oxidant. Polymerization into the conductive polymers occurs and coats the fibrous based material. The resulting conductive polymer-treated fibrous based material has microwave interactive characteristics and can be formed into a paper product by conventional papermaking techniques. Alternatively, the resulting slurry of conductive polymer-treated fibrous based material can be molded into an integral structure having a desired configuration and microwave heating profile.

Process and reaction conditions are controlled during polymerization of the monomer precursor so that the conductive polymers coat the fibrous material. Concentrations of the fibrous material, monomer and chemical oxidant, as well as the pH of the aqueous solution, are further adjusted to yield maximum polymerization of the monomer and optimal conductivity of the resulting polymer coated fibrous material.

Fibrous materials employed in the invention are selected from a group of cellulosic materials, such as pulp. In a preferred composite of the invention, the fibrous based material is refined resulting in fibrils which increase the surface area for coating of the conductive polymers. The refining process results in production of a more tightly bound and less porous material. Fiber lengths range from 3.0 to 6.0 mm and a diameter of 25 to 60 μm before refining and are preferably suspended and dispersed in an acidic aqueous medium maintained at a temperature range between 0°-100° C.

Preferred monomers employed in the invention are selected from a group of conductive polymers such as acetylene, aniline, pyrrole, paraphenylene, thiophene or derivatives thereof. The conductive polymers have chain lengths, and molecular weight distributions which vary as a function of the reaction time, temperature and concentration. Thermal decomposition temperatures of the polymers are in the range of 400°-600° F., which is at or above the upper temperature the material will reach in a microwave. Chemical oxidants to initiate polymerization include, but are not limited to, ammonium persulfate and ferric chloride.

A preferred composite of the invention comprises a cellulosic fibrous material composed of bleached softwood refined to 550 Canadian Standard Freeness ("CSF"), and a conductive polymer based on polymerization of pyrrole. In the preferred embodiment the fibrous material and polymeric constituents, respectively comprise approximately 91.7 to 96 and 4 to 8.3 wt. % of the composite.

In another embodiment the electrically conductive polymeric materials once formed are redoped with an ionic solution to enhance their electrical conductivity. Redoping is achieved by either spraying, or coating, the ionic solution onto the surface, or immersing the electrically conductive polymeric materials in the ionic solution. This dopant can be applied in a pattern, thereby creating designed packaging with interactive and noninteractive portions.

In a further embodiment of the invention, the electrically conductive polymeric materials once formed can be deactivated with a basic solution, such as 1N NaOH, to decrease or eliminate their microwave interactive capability. This solution can be applied by spraying or coating the surface of the electrically conductive polymeric materials or by immersion. A controlled heat profile feature in the composite is provided by selective application of the deactivating solution to patterned areas of the composite.

Preferred applications of the materials of the invention include use in microwave food packaging and in general microwave food wraps. As used in these applications, the materials of invention may be coated, by either extrusion or film lamination processes, with a polymeric film to act as a food release agent or barrier between the microwave susceptor material and food product. Advantageously, the electrically conductive polymeric materials provide a microwave susceptor material that is less complex to manufacture than metallic conductor or semi-conductor films. Further advantage is obtained by adjusting the basis weight and relative amounts of the electrically conductive polymeric materials to accommodate specific heat profile requirements of food products.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 2 is a schematic view of an apparatus for manufacture of the electrically conductive polymeric fibrous based materials of the invention in accordance with the process of FIG. 1;

FIG. 3 illustrates the effect of pulp reaction consistency during polymerization on the microwave heating profile of doped polyaniline coated fiber susceptor ("CFS"), under reaction conditions of Example III;

FIG. 4 illustrates the effect of pulp reaction consistency during polymerization on the microwave heating profile of doped polypyrrole CFS, under reaction conditions of Example I;

FIG. 14 illustrates the effects of polymerization temperature on the microwave heating performance of doped conductive 150lb/3MSF polypyrrole CFS, under the reaction conditions of Example I;

FIG. 14A graphically illustrates the effect of NaOH "deactivation" on the microwave heating performance of a 75lb susceptor sheet;

DETAILED DESCRIPTION OF THE PREFERRED EMBODIMENT

Figure 1:
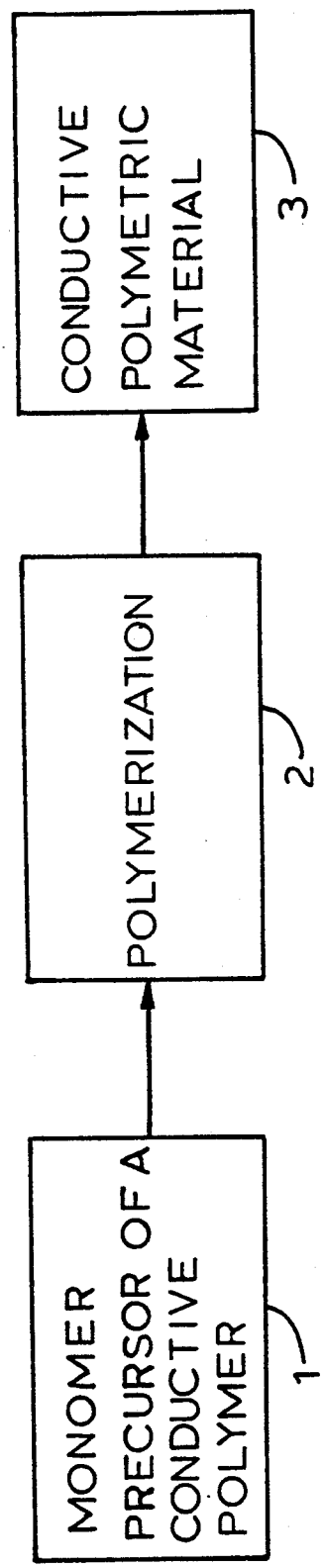
FIG. 1 is a diagrammatic view of the process for the formation of electrically conductive polymeric materials.

With further reference to the drawings, FIG. 1 is a diagrammatic view of the process steps for the formation of a microwave susceptor comprising electrically conductive polymers coated on fibrous based materials. Accordingly the resulting material, having microwave interactive characteristics, is formed into a paper product by conventional papermaking techniques or molded into an integral structure of desired configuration.

At station 1, fibrous based materials and a monomer precursor of a conductive polymer are suspended in an aqueous solution to form a slurry. Polymerization into conductive polymers occurs with the introduction of a chemical oxidant at station 2 inducing polymerization on the fibrous based material. Web formation into an electrically conductive polymeric fibrous based material is formed by conventional papermaking techniques at station 3.

In an alternate embodiment of the invention, at station 3, the resulting slurry of electrically conductive polymeric fibrous based material is applied to a perforated or draining mold. Heat and pressure are applied to the mold to form integral structures of the electrically conductive material into desired configurations.

FIG. 2 is a schematic view of an apparatus, generally designated 10, for the manufacture of electrically conductive polymeric fibrous based materials of the invention. In a preferred embodiment of the invention, the fibrous based material used is cellulosic fibers. Table I presents various types of cellulosic fibers which may be used in this invention.

TABLE I

| TYPES OF CELLULOSIC FIBERS |
| --- |
| Bleached hardwood pulp |
| Bleached softwood pulp |
| Low kappa* hardwood pulp |
| Low kappa softwood pulp |
| High kappa** hardwood pulp |
| High kappa softwood pulp |
| Recycled, post-consumer, bleached pulp (Ponderosa Company) |

*Low kappa means low lignin content
**High kappa means high lignin content

The fibrous based material is refined to a freeness of 550 CSF by passing it through stations 12, 14 and 18. Refining the pulp produces fibrils which increase the surface area for coating of the conductive polymers.

Accordingly, the greater surface area coated results in production of a more closely packed material and decreases the porosity of the resulting material. After refining, the fibrous material is pumped into stock tank 22. An aqueous solution is added to the stock tank, 22, through connection 24 to suspend the fibrous based material to form a slurry. Stirring further disperses the fibrous based material and creates optimal conditions for coating of the conductive polymer.

FIGS. 3 and 4 illustrate the effect of pulp consistency in the reaction vessel on the microwave heating profile of doped conductive polymers. Pulp consistency ratios, in the range of 1.9 to 3.7%, show maximum temperatures during microwave heating of between 250°-300° F. for doped polyaniline and between 300°-400° F. for doped polypyrrole. In general, the amount of fibrous based material per liter of aqueous solution is from 10 to 70 grams and preferably from about 30 to 40 grams.

Another means of controlling the microwave heating profile of doped conductive polymeric based material is by refining the pulp fibers to a predetermined freeness level. Pulp refining to decrease the freeness, measured as Canadian Standard Freeness (CSF), results in elevated maximum temperatures during microwave heating, if all other reaction and processing variables are held constant. In general, pulp fibers are refined in the range of 250 to 800 CSF, preferably from about 370 to 550 CSF.

In a preferred embodiment of the invention the aqueous solution is acidic with a hydrogen-ion concentration in the range of 0.1 to 1 molar which is maintained at a pH of 0 to 1. The utilization of an acidic aqueous solution allows for doping of the conductive polymer enhancing the conductivity of the material. For optimal microwave interactive characteristics, the aqueous solution temperature is maintained in the range of 0°-100° C., preferably at 20° C. As will be discussed hereinafter, the temperature in the invention process, in part is determinative of the rate of polymerization.

Following refining, a monomer precursor is added into the slurry in the stock tank, 22, through connection 24 with stirring. The rate of the addition of the monomer precursor into the slurry is controlled by valve 21. Pyrrole is the preferred monomer, both in terms of the microwave lossiness of the doped polypyrrole and for its reactivity. In addition, it has been found that aniline under proper conditions is a desirable monomer having lossy characteristics after doping similar to that of pyrrole. Alternative monomer precursors include acetylene, paraphenylene, thiophene and derivatives thereof.

Figure 5:
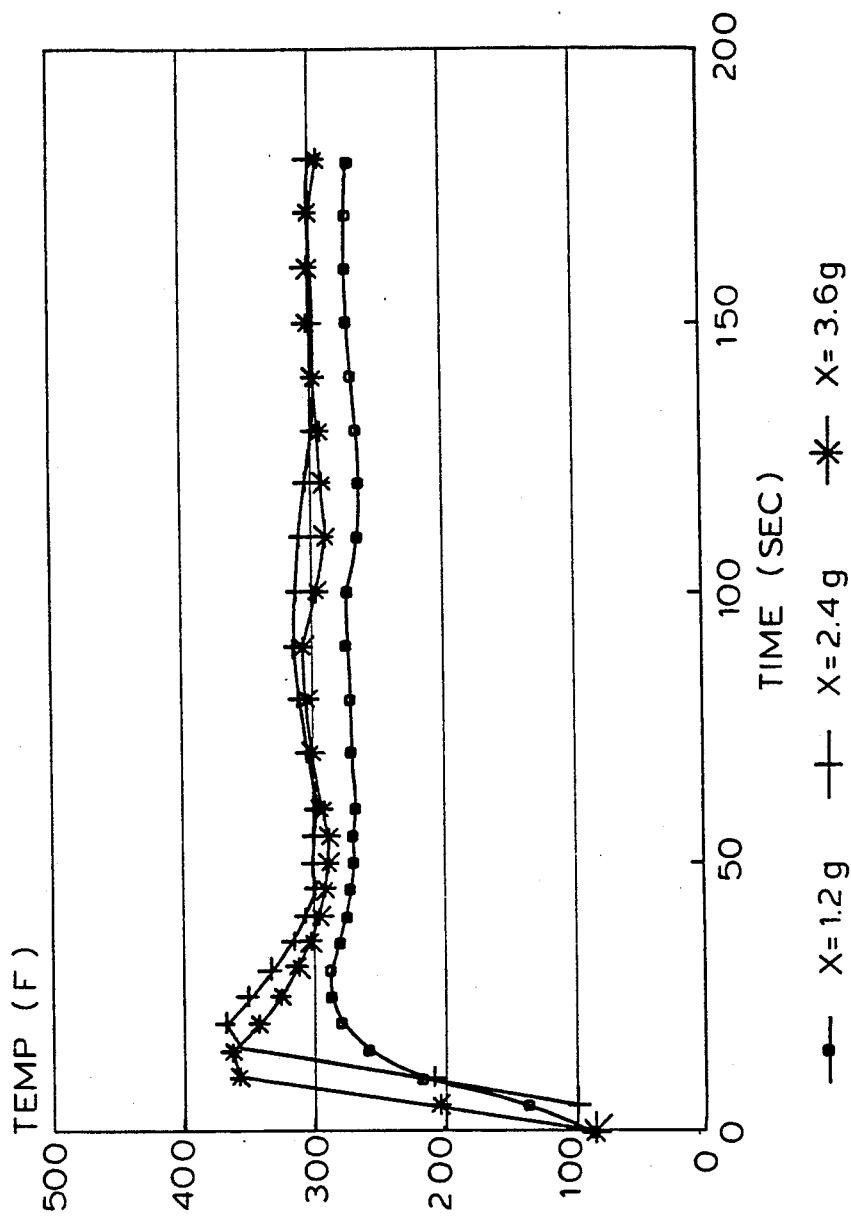
FIG. 5 is a graphic illustration of the effect of varying aniline concentration in the polymerization reaction on microwave heating performance on doped 150lb/3MSF* CFS, under reaction conditions of Example III.
Figure 6:
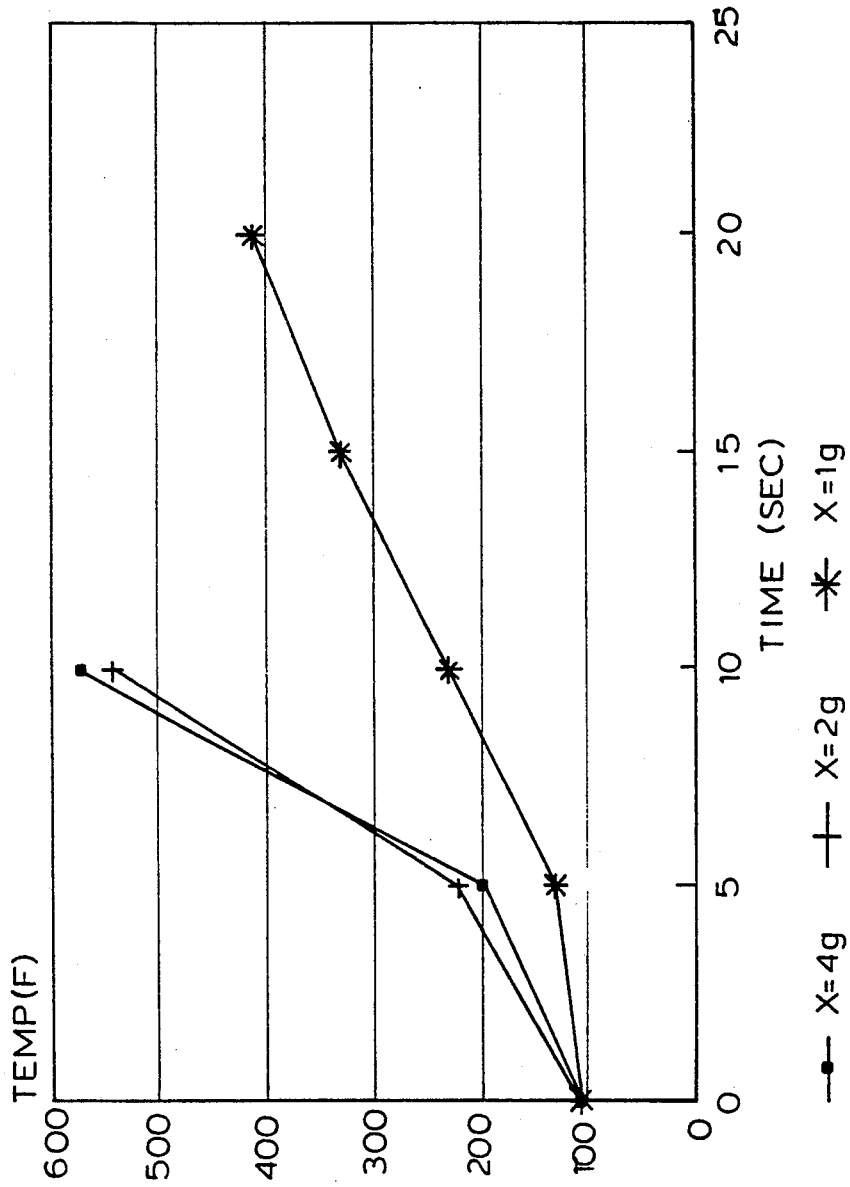
FIG. 6 is a graphic illustration of the effect of varying pyrrole concentration in the polymerization reaction on microwave heating performance on doped 150lb/3MSF* CFS, under reaction conditions of Example I.

FIGS. 5 and 6 illustrate the effect of varying the monomer concentration in the polymerization reaction on microwave heating performance. In general the concentration of the monomer precursor of the conductive polymer in aqueous solution may be from about 2 to 16 grams per liter. For both pyrrole and aniline polymers a preferred concentration of approximately 4 grams per liter results in optimal microwave heating performance. A particular advantage of the invention process is the effective utilization of the monomer precursor of a conductive polymer. Yields are greater than 50%, and with optimum conditions approach 90%.

Coating of the fibrous based material with the conductive polymer is effected by an adsorption of either the monomer or the polymerizing specie. Accordingly, the concentration of the fiber and monomer are determinative of the efficiency of polymer deposition onto the fibers. If concentration of the monomer, relative to the fibrous based material and/or aqueous phase is too high, polymerization may occur instantaneously in solution and a black precipitate (black polypyrrole) will be formed and settle on the bottom of the reaction chamber, decreasing the efficient use of the monomer. At excess fiber concentrations, efficient stirring becomes difficult, bulk polymerization may occur leaving fibers uncoated with conductive polymers.

After mixing the monomer precursor into the slurry, the chemical oxidant is pumped into stock tank 22 to induce polymerization of the monomer. It is believed that the monomer precursor polymerizes on the fibrous based material and not in solution. This result is obtained by controlling reaction conditions.

Oxidizing agents for promoting the polymerization of monomers may be used in this invention, for example, chemical oxidants containing a metal ion which is capable of changing its valance during polymerization. Suitable chemical oxidants for polymerization include compounds of metal ions, such as ferric chloride, as well as non-metallic types of oxidants including ammonium persulfate. Other oxidants can be used, but these oxidants are inexpensive and easy to utilize.

When employing one of the non-metallic chemical oxidants for promoting the polymerization of the monomer, it is also preferred to include a "doping" agent or counter ion since it is only the doped polymer that is conductive. For these polymers, anionic counter ions, such as chloride, are provided by HCl. Furthermore, as is well known, certain oxidants, such as ferric chloride, can provide the oxidant function and also supply the anionic counter ion. However, if the oxidizing agent is itself an anionic counter ion it may be desirable to use one or more other doping agents in conjunction with the oxidizing agent.

The amount of oxidant is a controlling factor in the polymerization rate. The total amount of oxidant should be at least equimolar to the amount of the monomer. In general, the concentration of oxidant used is from 0.086 to 0.346 molar. It is useful to use a higher or lower amount of the chemical oxidant to control the rate of polymerization and to assure effective utilization of the polymerizable monomer. However, when using ferric chloride or like compounds as the chemical oxidant, where the oxidant also provides the counter ion dopant, a preferred level of 0.173 molar is used.

Figure 9:
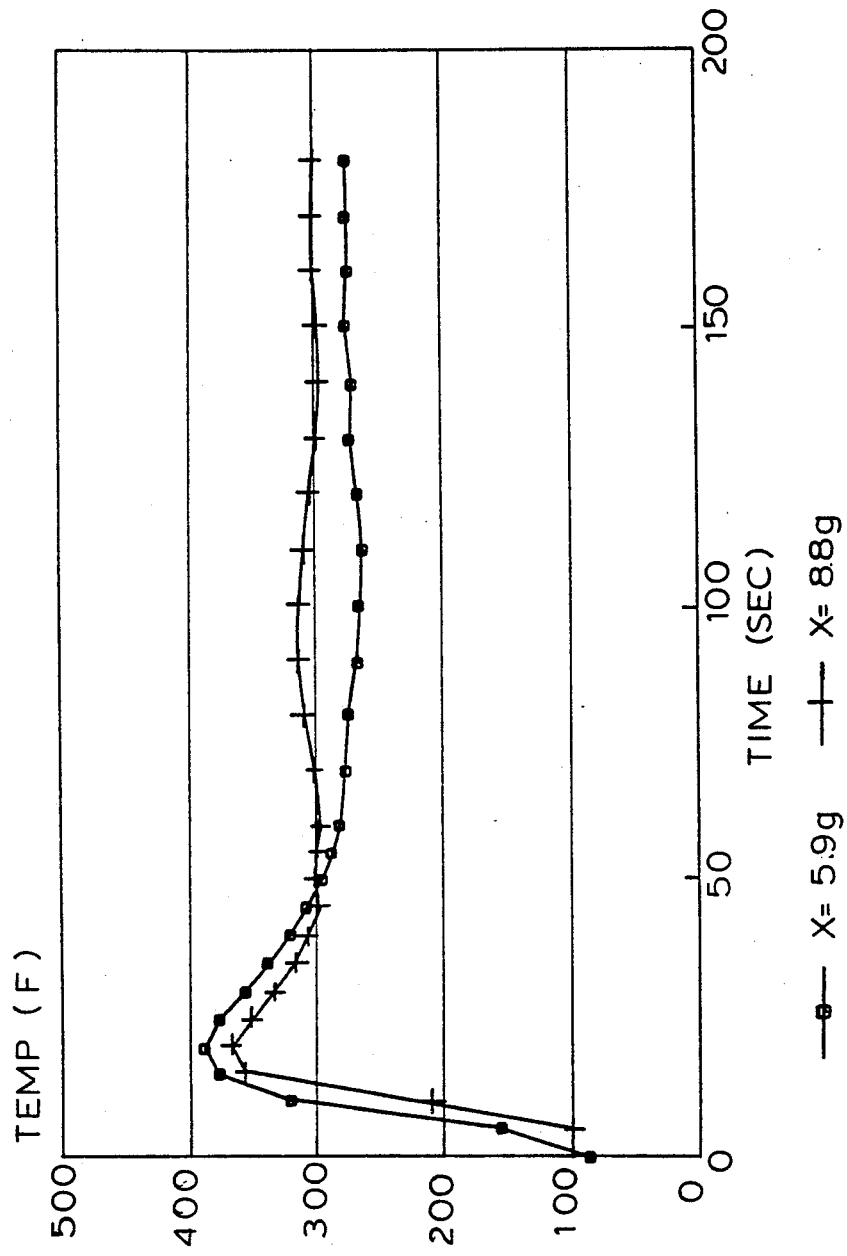
FIG. 9 illustrates the effect of varying the concentration of ammonium persulfate, as oxidant initiator, on the microwave heating performance of doped 150lb/3MSF polyaniline CFS.
Figure 10:
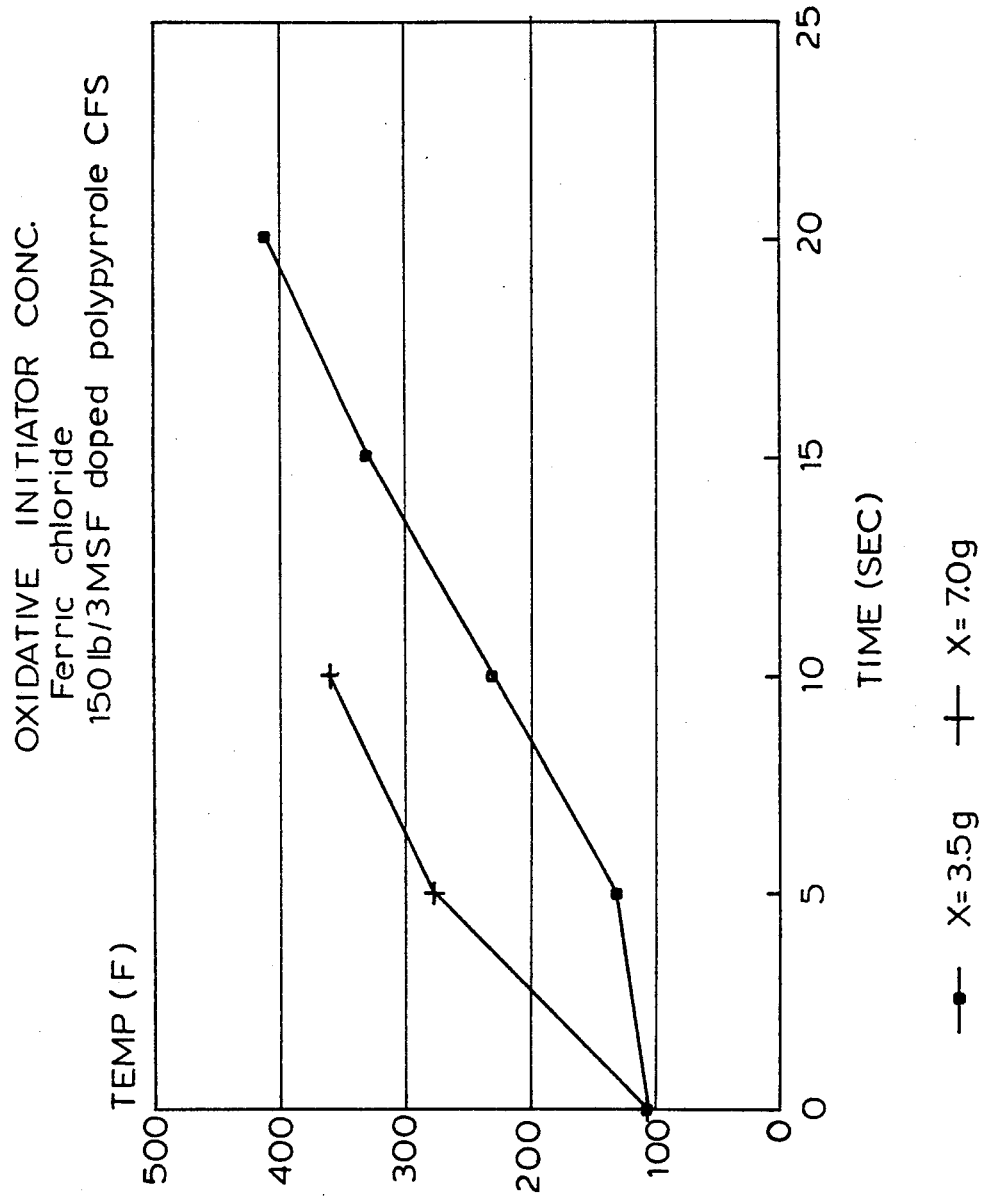
FIG. 10 illustrates the effect varying the concentration of ferric chloride, as oxidant initiator, on the microwave heating performance of doped 150lb/3MSF polypyrrole CFS.

FIGS. 9 and 10 illustrate the effect of chemical oxidant concentration on the microwave heating performance of doped polymer fibrous sheets. The concentration of ammonium persulfate, the oxidator initiator for doped polyaniline fibrous sheets, is in the range of 10-18 grams per liter, preferably at 12 grams per liter for optimum polymerization. The concentration of ferric chloride, the initiator for doped polypyrrole sheets, is in the range of 14 to 50 grams per liter, preferably at 28 grams per liter for optimal microwave heating performance.

The rate of polymerization of the monomer precursor is affected by a number of variables including pH of the reaction solution, time of the reaction, and temperature of the reaction solution.

Polymerization of the monomer precursor of a conductive polymer can be controlled by variations in the pH of the aqueous solution. In a preferred embodiment of the invention the fibrous based material is suspended in an acidic aqueous solution. Acidity of the solution can be conveniently provided by acids such as HCl, the doping agent or counter ion. It has been found that pH conditions from about 0 to 6.5 provide sufficient acidity to allow the polymerization to occur. Preferred conditions are encountered at a pH of from about 0 to 1.

Figure 11:
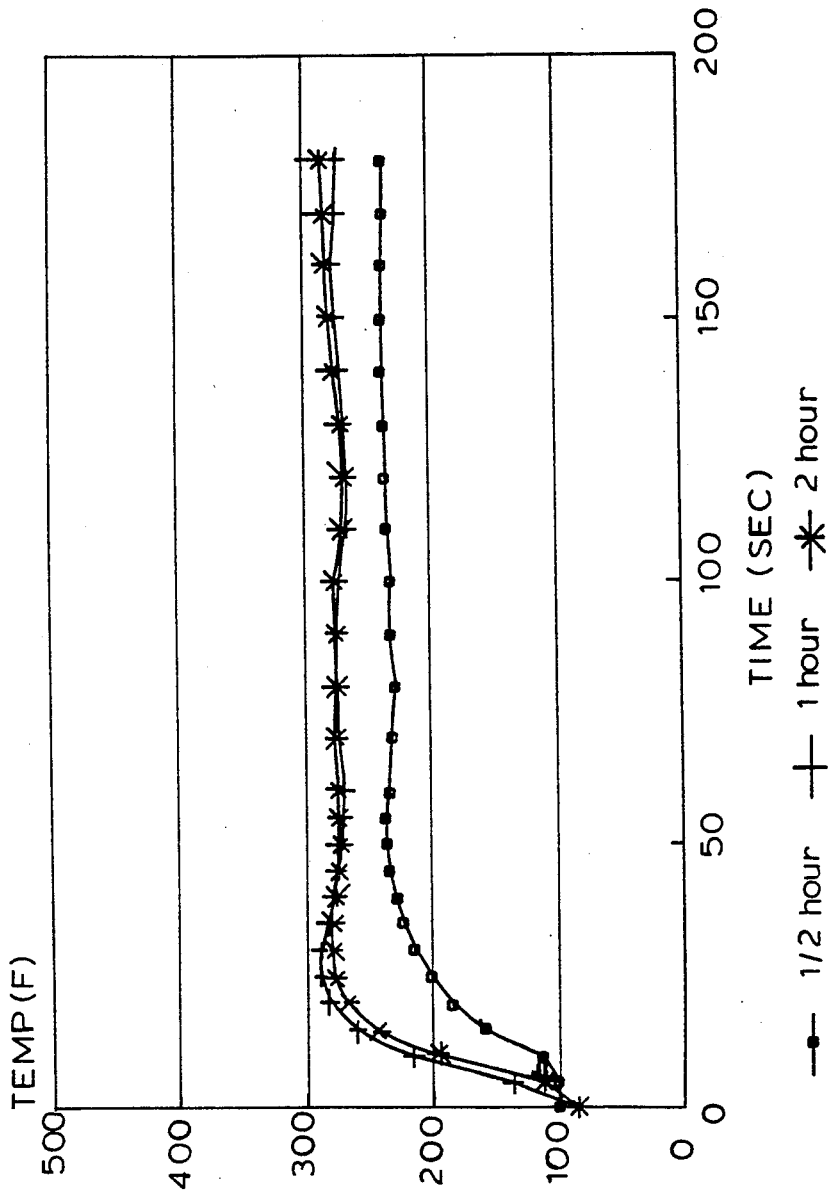
FIG. 11 illustrates the effect of polymerization time on the microwave heating performance of doped 150lb/3MSF polyaniline CFS, under the reaction conditions of Example III.
Figure 12:
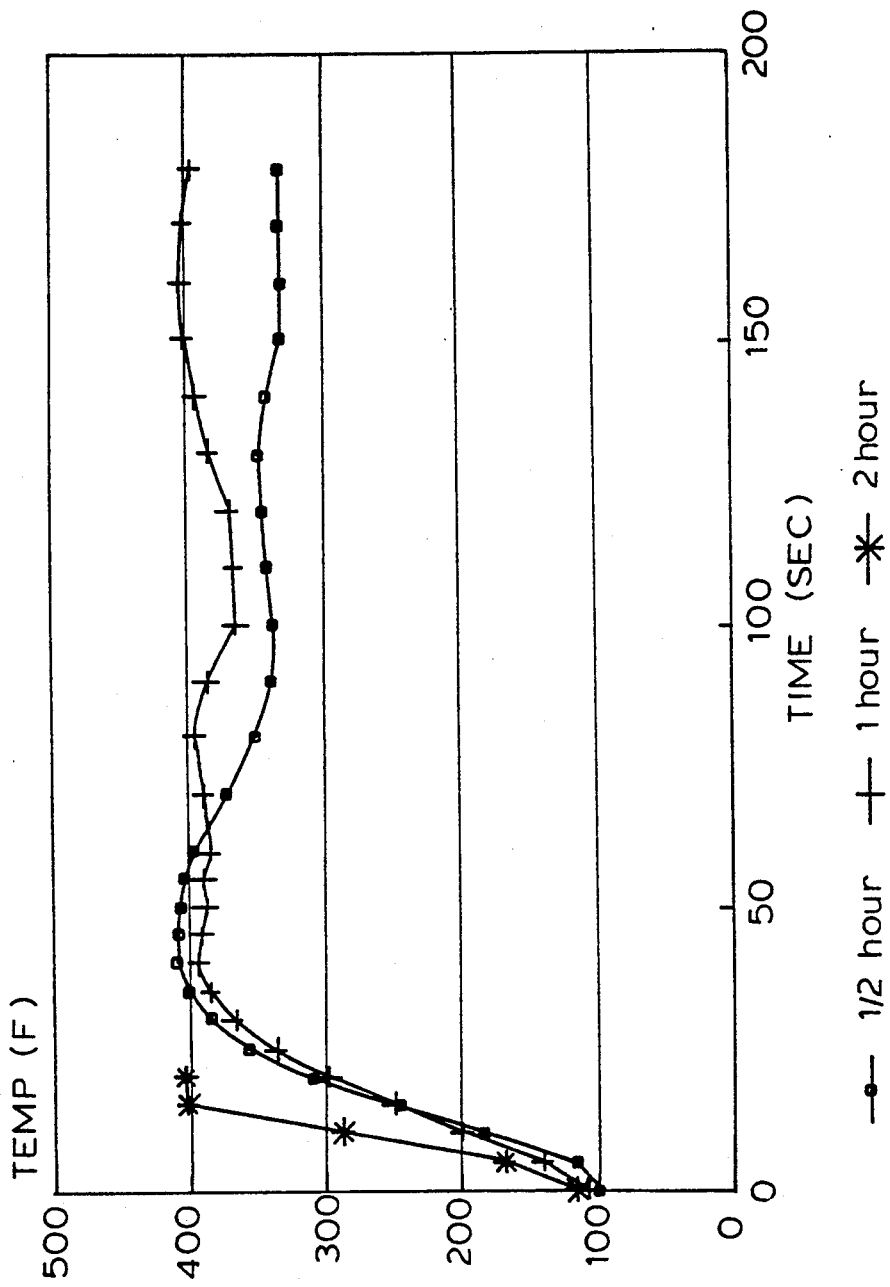
FIG. 12 illustrates the effect of polymerization time on the microwave heating performance of doped 150lb/3MSF polypyrrole CFS, under the reaction conditions of Example I.

Another factor in controlling the efficiency of polymerization is the reaction time. FIGS. 11 and 12 graphically illustrate the effects of polymerization time on the microwave heating performance of doped conductive polymer sheets. In both the polymerization of polyaniline and polypyrrole the optimum reaction time is in the range of 30 minutes to 4 hours, preferably 2 hours.

Figure 13:
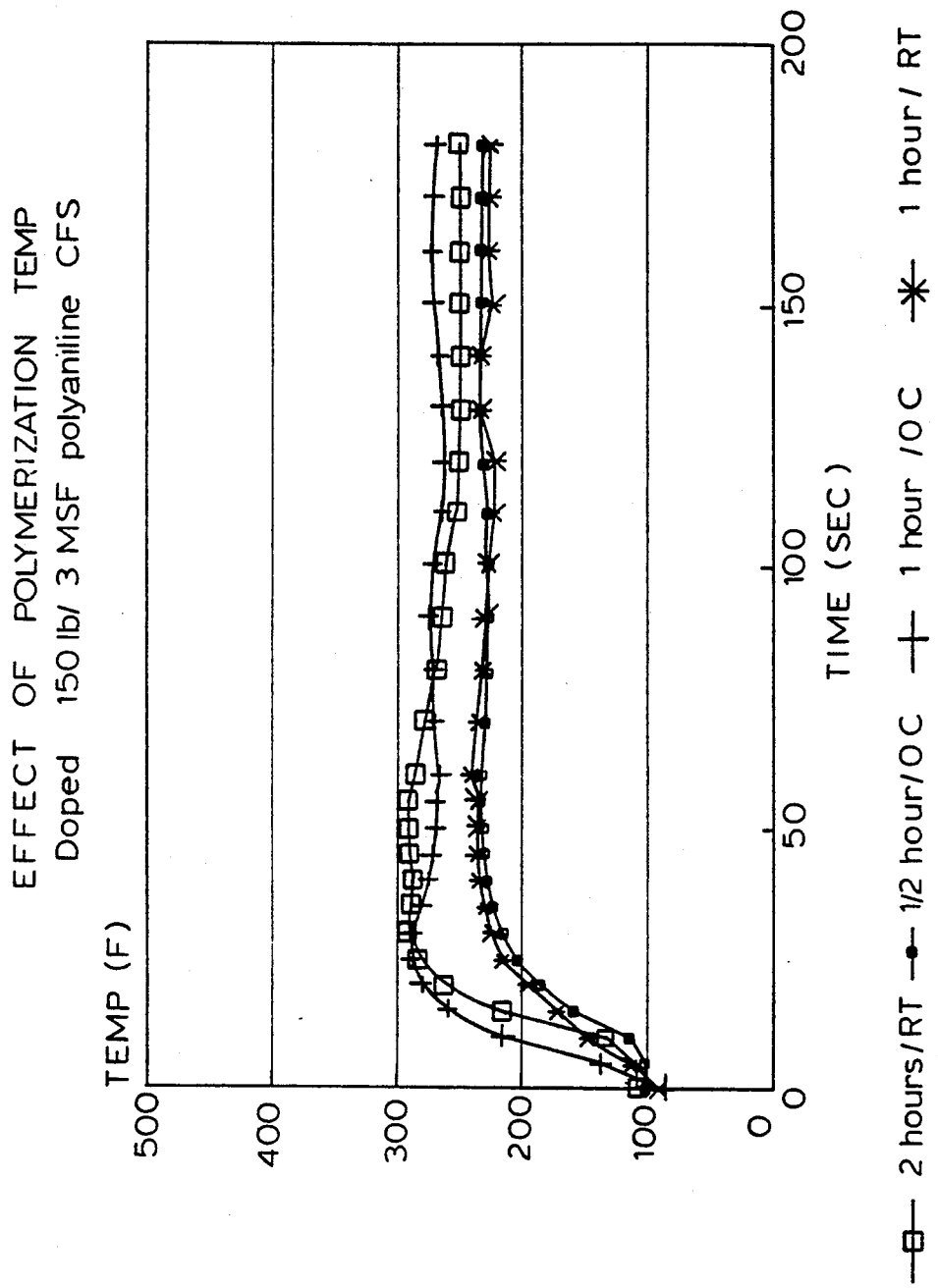
FIG. 13 illustrates the effects of polymerization temperature on the microwave heating performance of doped conductive 150lb/3MSF polyaniline CFS, under the reaction conditions of Example III.
Figure 15:
FIGS. 15-17 are photomicrographs of the electrically conductive polymeric material, respectively at 258X, 515X and 515X magnification, in accordance with Example I.
Figure 16:
Figure 17:
Figure 18:
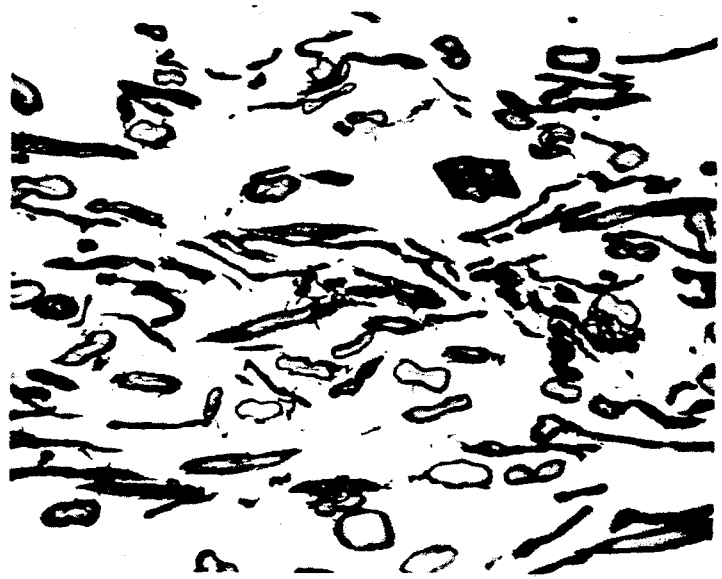
FIGS. 18-20 are photomicrographs of the electrically conductive polymeric material, respectively at 258X, 515X and 515X magnification, in accordance with Example II.
Figure 19:
Figure 20:
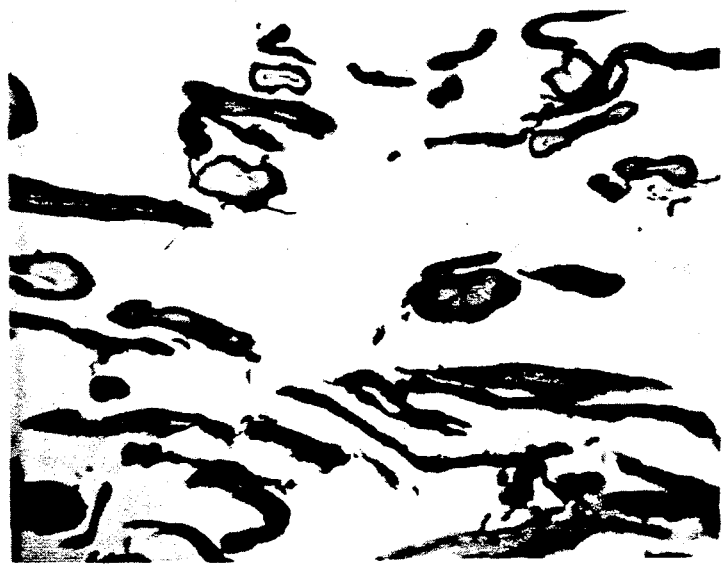
Figure 21:
FIGS. 21-23 are photomicrographs of the electrically conductive polymeric material, respectively at 258X, 515X and 515X magnification, in accordance with Example III.
Figure 22:
Figure 23:
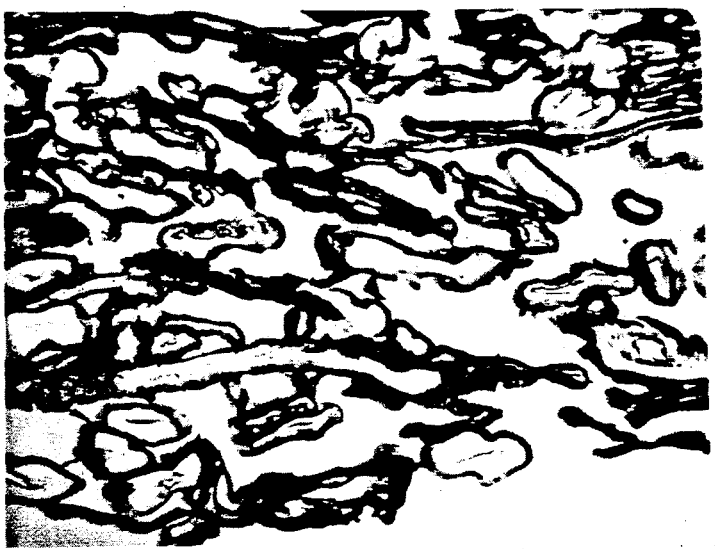
Figure 24:
FIGS. 24-26 are photomicrographs of the electrically conductive polymeric material, respectively at 258X, 515X and 515X magnification, in accordance with Example IV.
Figure 25:
Figure 26:
Figure 27:
FIGS. 27-30 are photomicrographs of the electrically conductive polymeric material, respectively at 500X, 2000X, 2000X, and 2000X magnification, in accordance with Example I.
Figure 28:
Figure 29:
Figure 30:
Figure 31:
FIGS. 31-34 are photomicrographs of the electrically conductive polymeric material, respectively at 500X, 2000X, 2000X, and 2000X magnification, in accordance with Example II.
Figure 32:
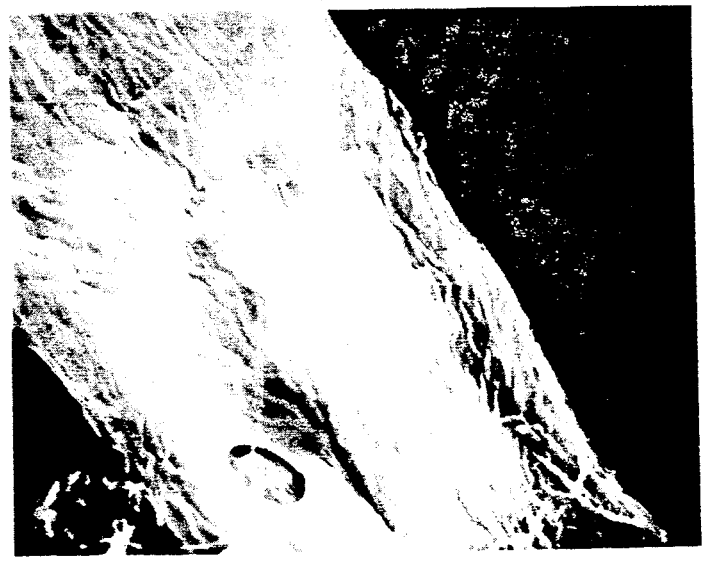
Figure 33:
Figure 34:
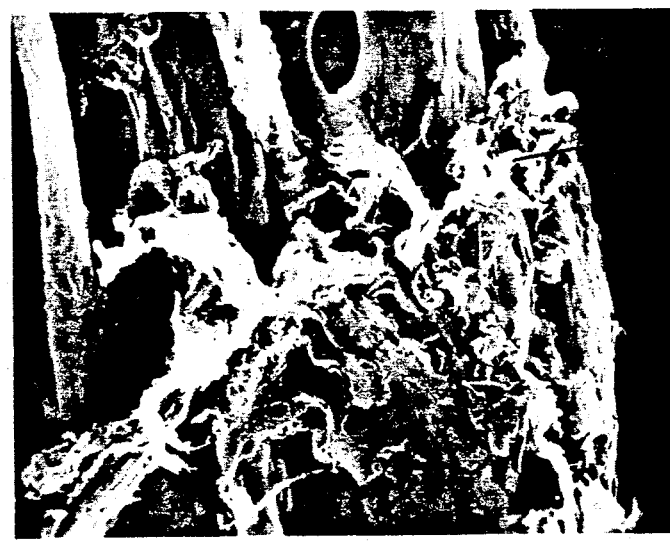
Figure 35:
FIGS. 35-38 are photomicrographs of the electrically conductive polymeric material, respectively at 500X, 2000X, 2000X, and 2000X magnification, in accordance with Example III.
Figure 36:
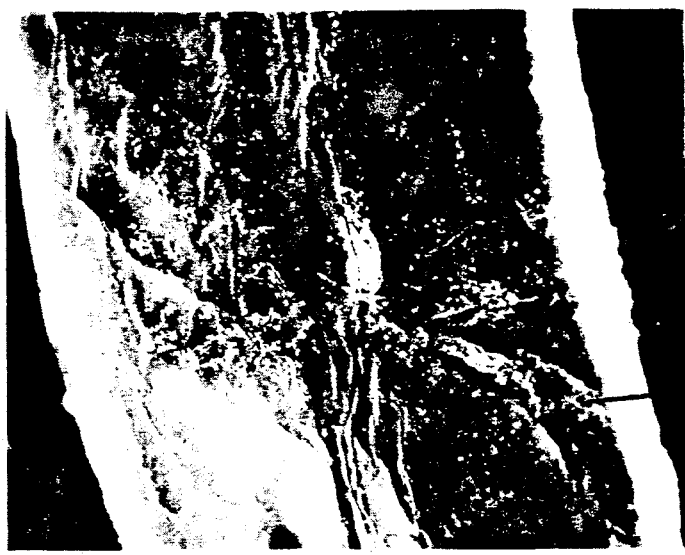
Figure 37:
Figure 38:
Figure 39:
FIGS. 39-42 are photomicrographs of the electrically conductive polymeric material, respectively at 500X, 2000X, 2000X, and 2000X magnification, in accordance with Example IV.
Figure 40:
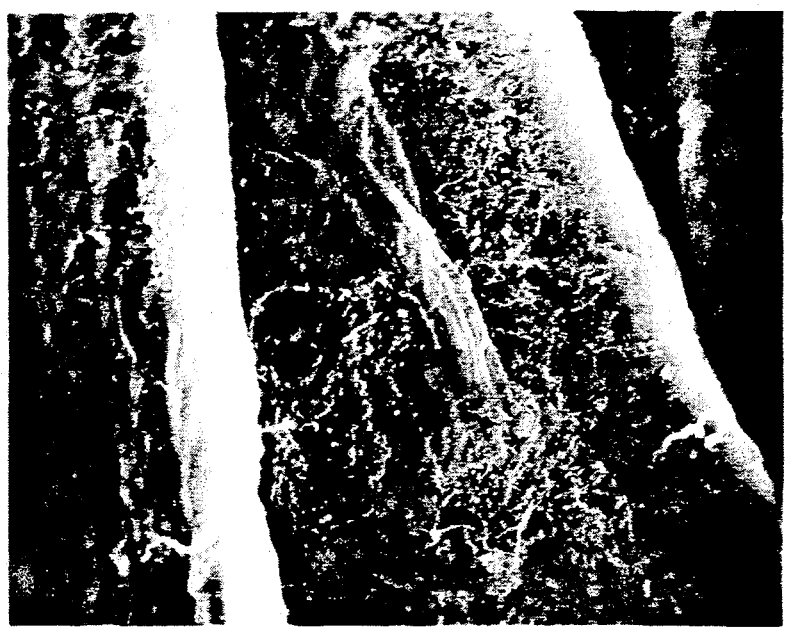
Figure 41:
Figure 42:
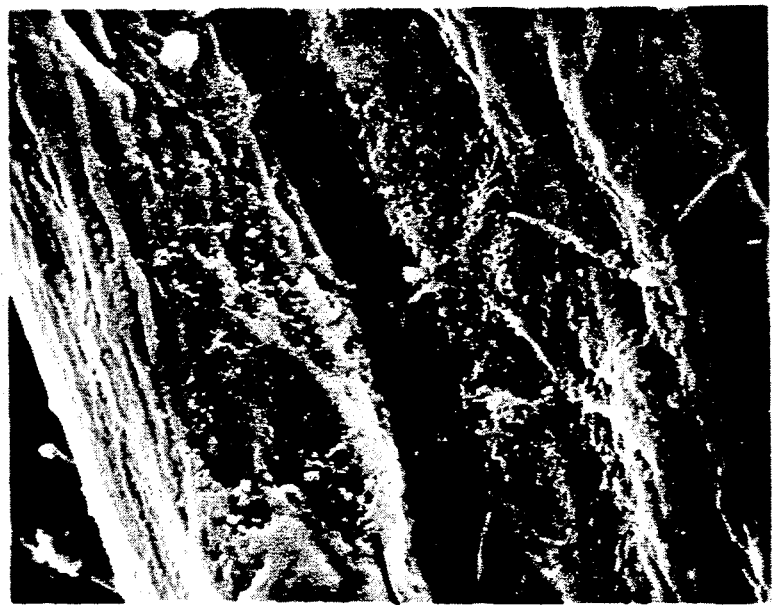

Another important factor in controlling the rate of polymerization is the reaction temperature. FIGS. 13 and 14 illustrate the effects of polymerization temperature on the microwave heating performance of doped conductive polymers. As is generally the case with chemical reactions, the polymerization rate will increase with increasing temperature. For practical reasons it is convenient to operate at or near room temperature, such as from about 10° C. to 30° C., preferably at 20° C. The polymerization reaction must take place at temperatures above the freezing point of the aqueous reaction solution so that the conductive polymer can be deposited onto the fibrous based material.

After polymerization, the polymer coated fibrous based material is pumped through valve, 38, into a machine chest, 32. The consistency of the fibrous based material off the machine chest is in the range of 0.5 to 2.0%, preferably 0.8%. The resulting material is passed through valve 44 to station 46 for web formation of the electrically conductive polymeric material.

In an alternate embodiment of the process, the polymer coated fibrous based material is neutralized to a pH range of 3 to 4.5, preferably 4, in the machine chest, 32, and then continues on through valve 44 to station 46 for web formation of the electrically conductive polymeric material.

Figure 2A:
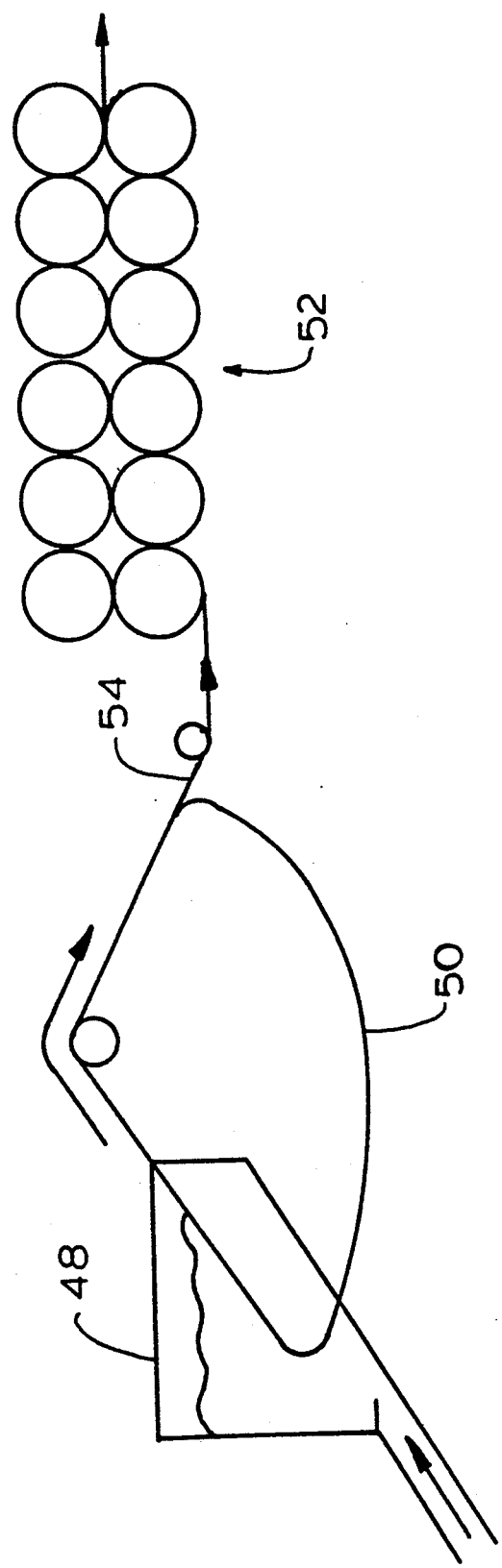
FIG. 2A is a schematic view of an apparatus for formation and drying of a web employed in the manufacture of the electrically conductive polymeric fibrous based materials of the invention.

FIG. 2A is a schematic view of the apparatus for the formation and drying of a web employed in the manufacture of the electrically conductive polymeric fibrous based materials of the invention. The polymer coated fibrous material is received by headbox 48. A web 54 is formed by machine 50 using a wet-lay process in accordance with conventional papermaking techniques. Thereafter, the web 54 enters a stack of drying rollers 52, which remove water from the web. The dried web 54 is then wound up on a reel (not shown in FIG. 2A) for further processing. Additionally, the web may be hot calendared to produce sheets having desired microwave interactive properties.

In an alternate embodiment of the invention uncoated fibrous based material is added to the slurry of conductive polymer coated fibrous based material. The blended mixture is then passed through station 46 and formed into a paper product. The addition of uncoated fibers increases its basis weight and changes the microwave interactivity of the resulting material.

In another embodiment of the invention, a layer of the conductive polymer coated fibrous based material is formed from the slurry at station 46. Additionally, a layer of uncoated fibrous based material is formed and added to the conductive polymer coated layer to form a multiple ply structure that has desired microwave interactive properties.

Table II set forth below, lists the machine conditions for producing a fibrous web of 401b, 501b, 601b, 751b and 1101b materials fabricated in accordance with the invention process as described in Examples I to IV and employing the apparatus of FIGS. 2 and 2A. The initial machine chest consistency of the slurry of conductive polymer coated fibers was 2.00% having a stock freeness of 550CSF. The stoichiometry of the polymerization reaction used in preparing the materials was as follows: 10 g of pulp; 7 g ferric chloride; 1 g pyrrole; and 250 ml 1N HCl.

The conditions listed below were uniformly applied in the production of web materials in Table II:

| | |
|---|---|
| Headbox Flow | 1,020 kg/hour (37.4 optical density #/hr.) |
| Flatbox Vacuums | 0,0,0,0, psi |
| Vacuum Foils | 7¼ inches of Hg |
| Press Loadings | 1st Front/Back 10 psi/10 psi |
| | 2nd Front/Back 12 psi/12 psi |
| Dry end paper width | 40.5 inches |

TABLE II
MACHINE CONDITIONS/PRODUCTION QUANTITIES

| | 40 lb. | 50 lb. | 60 lb. | 75 lb. | 110 lb. |
|---|---|---|---|---|---|
| Head Box consistency (%) | 0.36 | 0.36 | 0.5 | 0.5 | 0.5 |
| Head Box pH | 2.3 | 2.3 | 2.3 | 2.3 | 2.3 |
| Machine Speed (fpm*) | 170 | 154 | 117 | 100 | 70 |
| Couch Vacuum (psi) | ** | ** | 1.25 | 1.25 | 2.5 |
| Re-reeled lineal feet produced (ft) | 1,800 | 900 | 3,100 | 2,600 | 2,200 |

*Feet per minute
**not recorded

Table III set forth below lists the physical properties of the material formed under the machine conditions in Table II and fabricated in accordance with the invention process as described in Examples I to IV, employing the apparatus of FIGS. 2 and 2A. The paper produced exhibited microwave interactive characteristics and thermal decomposition temperatures in the range of 400°-600° F.

TABLE III
PAPER PROPERTIES - MICROWAVE PAPER

| | 40 lb. | 50 lb. | 60 lb. | 75 lb. | 110 lb. |
|---|---|---|---|---|---|
| Basis Wt. (lb/3,000 ft$^2$) | 46.2 | 53.4 | 64.9 | 78.5 | 109.7 |
| Caliper (mils) | 7.1 | 8.1 | 9.6 | 11.2 | 14.6 |
| Gurley Density (sec/100 cc) | 1.5 | 1.0 | 2.0 | 2.0 | 3.0 |
| Stiffness, Taber | | | | | |
| MD | 2.65 | 4.06 | 5.40 | 9.60 | 44.7 |
| CD | .99 | 1.74 | 2.88 | 4.84 | 1.64 |
| Mullen (psi) | 14 | 15 | 19 | 28 | 44 |
| Tear MD (g force) | 95 | 118 | 134 | 162 | 254 |
| CD | 102 | 122 | 157 | 189 | 356 |
| Fold MD (MIT) | 16 | 29 | 22 | 59 | 75 |
| CD | 6 | 7 | 10 | 12 | 23 |
| Tensile | | | | | |
| MD (kg/15 mm) | 3.03 | 3.60 | 5.08 | 6.54 | 10.32 |
| CD | 1.87 | 2.07 | 2.29 | 3.04 | 4.21 |
| Elongation MD (%) | 1.10 | 1.12 | 1.34 | 1.37 | 1.83 |
| CD | 2.08 | 2.81 | 2.53 | 3.15 | 3.78 |
| TEA MD (kg-m/m2) | 1.31 | 1.46 | 2.61 | 3.77 | 8.07 |
| CD | 2.13 | 2.62 | 3.16 | 5.04 | 7.99 |
| Internal Bond (ft-lbf) | 87 | 98 | 86 | 85 | 85 |
| Moisture - 50% RH | 7.42 | 7.42 | 7.47 | 7.34 | 7.73 |
| Extract pH | 2.81 | 2.81 | 2.82 | 2.82 | 2.79 |

In an alternative embodiment of the invention, the slurry of electrically conductive fibrous based material is applied directly to a perforated or draining mold. Heat and pressure are applied to the mold to form integral structures of desired configurations, having microwave interactive characteristics.

Figure 7:
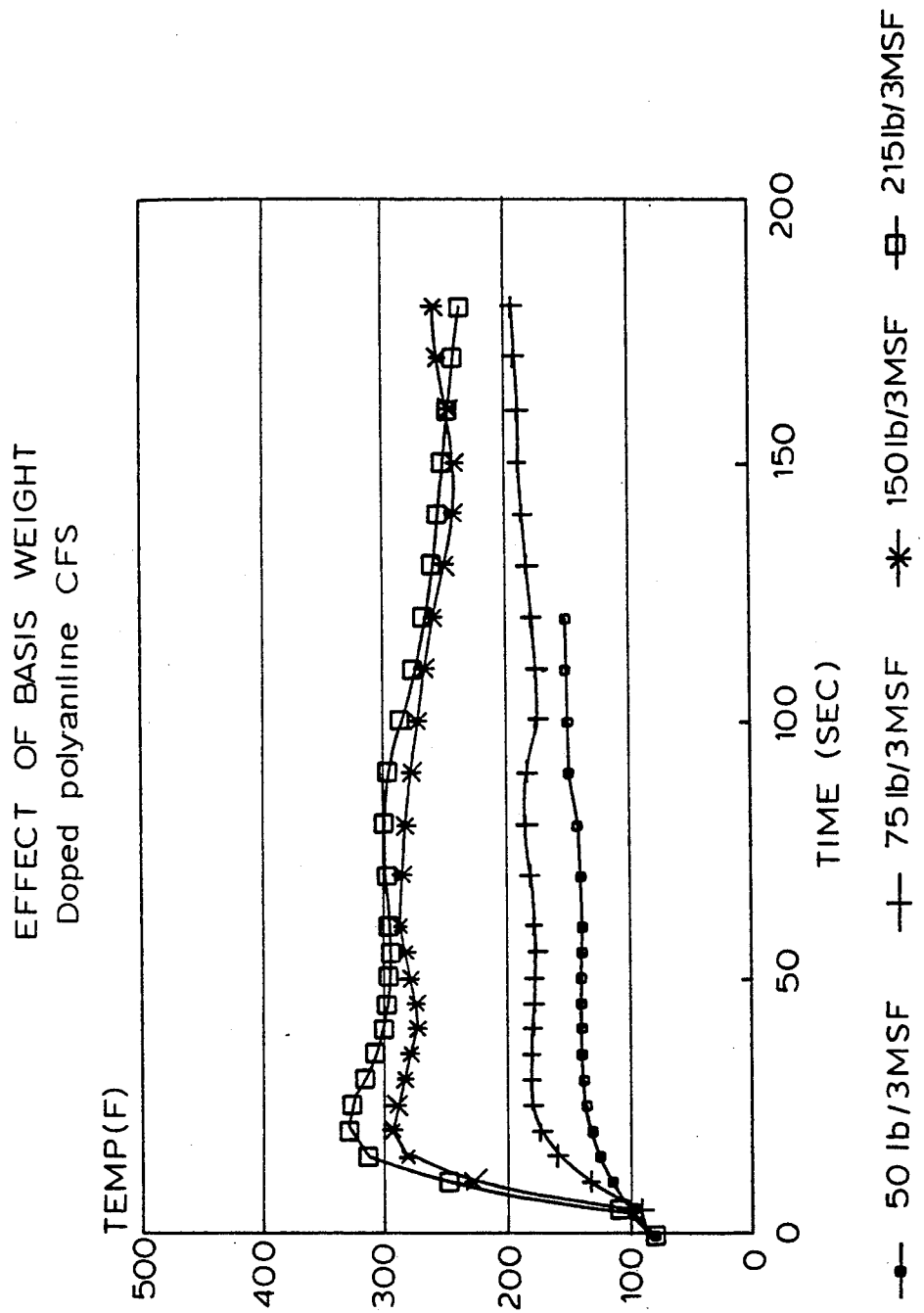
FIG. 7 illustrates the effect of basis weight of doped conductive polyaniline CFS on microwave heating performance of 50lb/3MSF, 75lb/3MSF, 150lb/3MSF, and 215lb/3MSF board materials.
Figure 8:
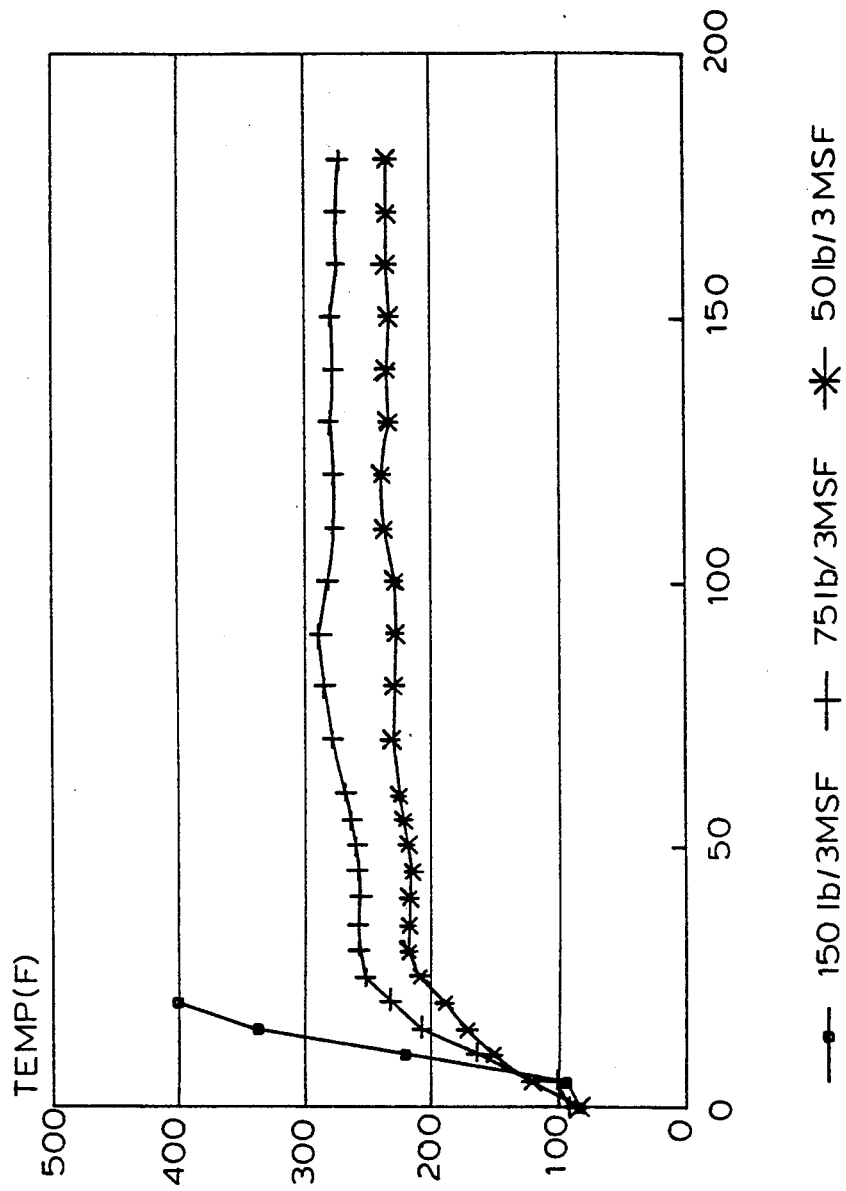
FIG. 8 illustrates the effect of basis weight of doped conductive polypyrrole CFS on microwave heating performance of 50lb/3MSF, 75lb/3MSF, and 150lb/3MSF board materials.

Table IV and FIGS. 7 and 8 illustrate the effect of basis weight of doped conductive polymer fibrous based sheets on microwave heating performance. By adjusting the basis weight of the resulting electrically conductive material a desired microwave heating temperature can be achieved. Microwave heating performance can be customized to accommodate specific heat profile requirements.

TABLE IV
EFFECT OF BASIS WEIGHT ON MICROWAVE HEATING PERFORMANCE

| Basis Weight | Conductive Polymer | Doping Agent | Maximum Temperature °F. |
|---|---|---|---|
| 150 lb/3MSF | polypyrrole | $FeCl_3$ | >500 |
| 75 lb/3MSF | polypyrrole | $FeCl_3$ | 300 |
| 50 lb/3MSF | polypyrrole | $FeCl_3$ | 225 |
| 215 lb/3MSF | polyaniline | $(NH_4)_2S_2O_8$ | 325 |
| 150 lb/3MSF | polyaniline | $FeCl_3$ | 300 |
| 75 lb/3MSF | polyaniline | $(NH_4)_2S_2O_8$ | 200 |
| 50 lb/3MSF | polyaniline | $(NH_4)_2S_2O_8$ | 150 |

In the following examples, electrically conductive polymeric fibrous based materials were produced on a prototype process line simulating process conditions for bulk production of the material as shown in FIG. 2. Examples I to IV were produced by suspending the fibrous materials in an acidic aqueous solution and adding a monomer precursor and chemical oxidant to induce polymerization. The electrically conductive polymeric material was filtered, dried and made into a paper product through conventional papermaking techniques.

EXAMPLE I

Fibers of bleached softwood pulp were suspended and dispersed in 1N HCl in a slurry containing 40 grams of pulp per liter. The reaction vessel was cooled with an ice/water bath. With rapid stirring, 4 grams of pyrrole were added to the slurry and 14.0 grams of $FeCl_3 \cdot 6H_2O$ dissolved in 75 ml of water were added. The pulp slowly turned the characteristic black color of polypyrrole. No polypyrrole precipitated out of solution as in the case of solution polymerization of pyrrole. The polymer-coated pulp was filtered and washed with water. This was dried 18 hours at room temperature. The polymer-coated pulp fibers were made into a handsheet using standard Technical Association of the Pulp and Paper Industry ("TAPPI") procedures.

EXAMPLE II

Fibers of bleached softwood pulp were suspended and dispersed in 1N HCl in a slurry containing 40 grams of pulp per liter. The reaction vessel was cooled with an ice/water bath. With rapid stirring, 8 grams of pyrrole were added to the slurry and 14.0 grams of $FeCl_3 \cdot 6H_2O$ dissolved in 75 ml of water were added. The pulp slowly turned the characteristic black color of polypyrrole. No polypyrrole precipitated out of solution as in the case of solution polymerization of pyrrole. The polymer-coated pulp was filtered and washed with water. This was dried 18 hours at room temperature. The polymer-coated pulp fibers were made into a handsheet using standard TAPPI procedures.

EXAMPLE III

Fibers of bleached softwood pulp were suspended and dispersed in 1N HCl in a slurry containing 40 grams of pulp per liter. The reaction vessel was cooled with an ice/water bath. With rapid stirring, 4.8 grams of aniline were introduced into the slurry and then 11.8 grams of ammonium persulfate dissolved in 75 ml of water were added. The pulp slowly turned the characteristic emeraldine color of polyaniline. No polyaniline precipitated out of solution as in the case of solution polymerization of aniline. The polymer-coated pulp was filtered and washed with water. This was dried 18 hours at room temperature. The polymer-coated pulp fibers were made into a handsheet using standard TAPPI procedures.

EXAMPLE IV

Fibers of bleached softwood pulp were suspended and dispersed in 1N HCl in a slurry containing 40 grams of pulp per liter. The reaction vessel was cooled with an ice/water bath. With rapid stirring, 9.6 grams of aniline were introduced into the slurry and then 11.8 grams of ammonium persulfate dissolved in 75 ml of water were added. The pulp slowly turned the characteristic emeraldine color of polyaniline. No polyaniline precipitated out of solution as in the case of solution polymerization of aniline. The polymer-coated pulp was filtered and washed with water. This was dried 18 hours at room temperature. The polymer-coated pulp fibers were made into a handsheet using standard TAPPI procedures.

The conductive polymer coated fibrous based Examples I to IV were prepared as stated above using pulp as the fibrous based material and the following amounts of conductive polymeric material:

EXAMPLE I Polypyrrole; 4 grams of monomer
EXAMPLE II Polypyrrole; 8 grams of monomer
EXAMPLE III Polyaniline; 4.8 gram of monomer
EXAMPLE IV Polyaniline; 9.6 gram of monomer FIGS. 15 to 26 are photomicrographs at magnifications of 258X and 515X of Examples I to IV. Small specimens from each sample were cut and embedded in an epoxy low viscosity embedding medium. Cross sections were made with a microtome and mounted on a microscope slide with a drop of immersion oil prior to examination. FIGS. 15 to 20, show penetration of polypyrrole, 54, into the fibrous material, 56. As seen in FIGS. 21 to 26, polyaniline, 58, does not penetrate into the fibers as well as polypyrrole but accumulates on the fibrous material, 56, surface.

FIGS. 27 to 42 are electron micrographs of the Examples I to IV produced at magnifications of 500X and 2000X. These photographs showed uneven Coating of both polypyrrole and polyaniline onto the fibrous material. In FIGS. 27 to 34, the polypyrrole coating forms string-like structures, 60, of varying thickness on the surface of the fibrous material. As seen in FIGS. 35 to 42 the polyaniline coating has a granular surface coating structure, 62, accumulating in clusters, on the fibrous based material. In general, the thickness of the layer of conductive polymer is in the range of 10–1000 μm.

From the foregoing, it will be appreciated that the invention achieves the objects stated heretofore. Microwave susceptor materials are provided which utilize conductive polymers coated on fibrous based materials. The method for production of the invention obtains enhanced processibility of the conductive polymers while maintaining high lossiness of the polymer.

Due to the enhanced processability of the conductive polymers, it is an advantage of the invention to be shaped into any desired configuration, without impairing its microwave heating characteristics. The heating properties of the material can be further influenced by either spraying or immersing in an acidic or basic aqueous solution. For example, the microwave interactivity of the invention is enhanced by immersing the conductive polymeric material in a solution of 1N hydrochloric acid. Upon removal from the acidic solution, the material is wet pressed and dried at 90° C. In another example, the conductive polymeric material is immersed into a solution of 0.1N NaOH and subsequently dried. This treatment decreases the microwave lossiness of the material. See FIG. 14A. The invention thus provides a means to custom design packaging for microwave cooking of various food items.

Advantageously, the conductive polymers coated on fibrous based materials may be employed on conventional process lines without requirement of extensive retooling. The method for producing the electrically conductive polymeric material is less complex than the production of metallic conductive and semiconductive microwave susceptive materials.

In addition, the utilization of conventional process lines and enhanced processibility of conductive polymer provide low cost, flexible microwave food packaging. In particular fiber freeness, the basis weight, and relative amounts of the electrically conductive polymeric material can be varied to accommodate specific heat profile requirements of the package.

It will be recognized by those skilled in the art that the invention and process have wide application in the production of a diversity of electrically conductive paper or paper-like products having microwave susceptive characteristics and heating profiles determined by the basis weight and relative amounts of conductive polymeric materials.

Numerous modifications are possible in light of the above disclosure. For example, the preferred embodiment employs 100% polymer-coated fibers to construct the conductive polymer fibrous sheet, polymer-coated fibers may be mixed with uncoated fibers in machine chest 32 immediately prior to the material passing through valve 44 to station 46 for web formation. This is another means for varying the microwave heating characteristics to match requirements of food cooked thereon. Finally, the microwave interactive material can be composed of a dual structure of polymer-coated fibers and uncoated fibers in a layered approach. This may be accomplished by having two separate sources of these fibers feeding into consecutive headboxes, 48, on the web-forming apparatus illustrated in FIG. 2A.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A method for producing an electrically conductive polymeric material having microwave susceptive characteristics comprising the steps of:
   suspending a fibrous based material in an aqueous solution to form a slurry;
   wherein the concentration of said fibrous based material is in the range of 10 to 70 grams per liter;
   introducing a monomer precursor of a conductive polymer into said slurry;
   wherein said monomer precursor is selected from the group consisting of acetylene, aniline, pyrrole, paraphenylene, thiophene and derivatives thereof and has a concentration in the range of 2 to 16 grams per liter;
   adding a chemical oxidant to said slurry to induce polymerization of said monomer precursor into conductive polymers on said fibrous based material to form a slurry of polymer coated fibrous based material;
   wherein said chemical oxidant is ammonium persulfate or ferric chloride and has a concentration in the range of 10 to 50 grams per liter; and
   forming the electrically conductive polymeric material from said slurry of polymer coated fibrous based material.

2. The method as defined in claim 1, comprising the further step of redoping the electrically conductive polymeric material with an acidic solution.

3. The method as defined in claim 2, wherein said acidic solution is 1N HCl.

4. The method as defined in claim 1, comprising the further step of deactivating the electrically conductive polymeric material with a basic solution.

5. The method as defined in claim 4, wherein said basic solution is 1N NaOH.

6. The method as defined in claim 1, wherein said aqueous solution is maintained at a pH and temperature, respectively, in the range of 0 to 6.5 and 0°-100° C.

7. The method as defined in claim 1, wherein said fibrous based material is cellulosic fibers, having a fiber length range of 3.0 to 6.0 mm and a diameter range of 25 to 60 μm, before refining.

8. The method as defined in claim 7, wherein said cellulosic fiber is bleached pulp, low kappa pulp, high kappa pulp or recycled bleached pulp.

9. The method as defined in claim 1, wherein said chemical oxidant is ammonium persulfate and has a concentration in the range of 10 to 18 grams per liter.

10. The method as defined in claim 1, wherein the concentration of said monomer precursor is approximately 4 grams per liter.

11. The method as defined in claim 1, wherein the concentration of said fibrous based material is in the range of 30 to 40 grams per liter.

12. The method as defined in claim 1, wherein said slurry of polymer coated fibrous based material is formed into paper or paperboard using conventional papermaking techniques.

13. The method as defined in claim 12, comprising the further step of blending said slurry of polymer coated fibrous based material with uncoated fibrous based material and forming into paper or paperboard using conventional papermaking techniques.

14. The method as defined in claim 13, wherein a separate layer of uncoated fibrous based material is added to a layer of said polymer coated fibrous based material and formed into paper or paperboard having a multiple ply structure that has desired microwave interactive properties.

15. The method as defined in claim 1, wherein said slurry of polymer coated fibrous based material is molded into an integral structure.

16. The method as defined in claim 15, wherein said integral structure is formed by applying said slurry of polymer coated fibrous based material to a perforated or draining mold followed by application of heat and pressure to form a desired shape.

17. The method as defined in claim 1, wherein said electrically conductive polymeric material is comprised of 70 to 98 wt. % of said fibrous based material and 2 to 30 wt. % of said conductive polymer.

18. The method as defined in claim 1, wherein the thickness of said conductive polymer is within the range of 10 to 1000 μm.

19. The method as defined in claim 1, wherein said slurry of polymer coated fibrous based material is formed into sheets of paper or paperboard with basis weights in the range of 50 to 215 lb/3MSF, having microwave heating capacities in the range of 150° to +500° F.

20. The method as defined in claim 19, wherein said paper or paperboard has microwave interactive characteristics and a thermal decomposition temperature in the range of 400° to 600° F.

21. The method as defined in claim 19, wherein said paper or paperboard formed has a MD tensile strength in the range of 3.03 to 10.32 kg/15 mm and a CD tensile strength in the range of 1.87 to 4.21 kg/15 mm; and an internal bond distance between 85 and 98 ft/lb.

22. The method as defined in claim 1, wherein said chemical oxidant is ferric chloride and has a concentration in the range of 14 to 50 grams per liter.

23. The method as defined in claim 12, wherein said paper or paperboard is coated with a polymeric film.

* * * * *